Figure 1:
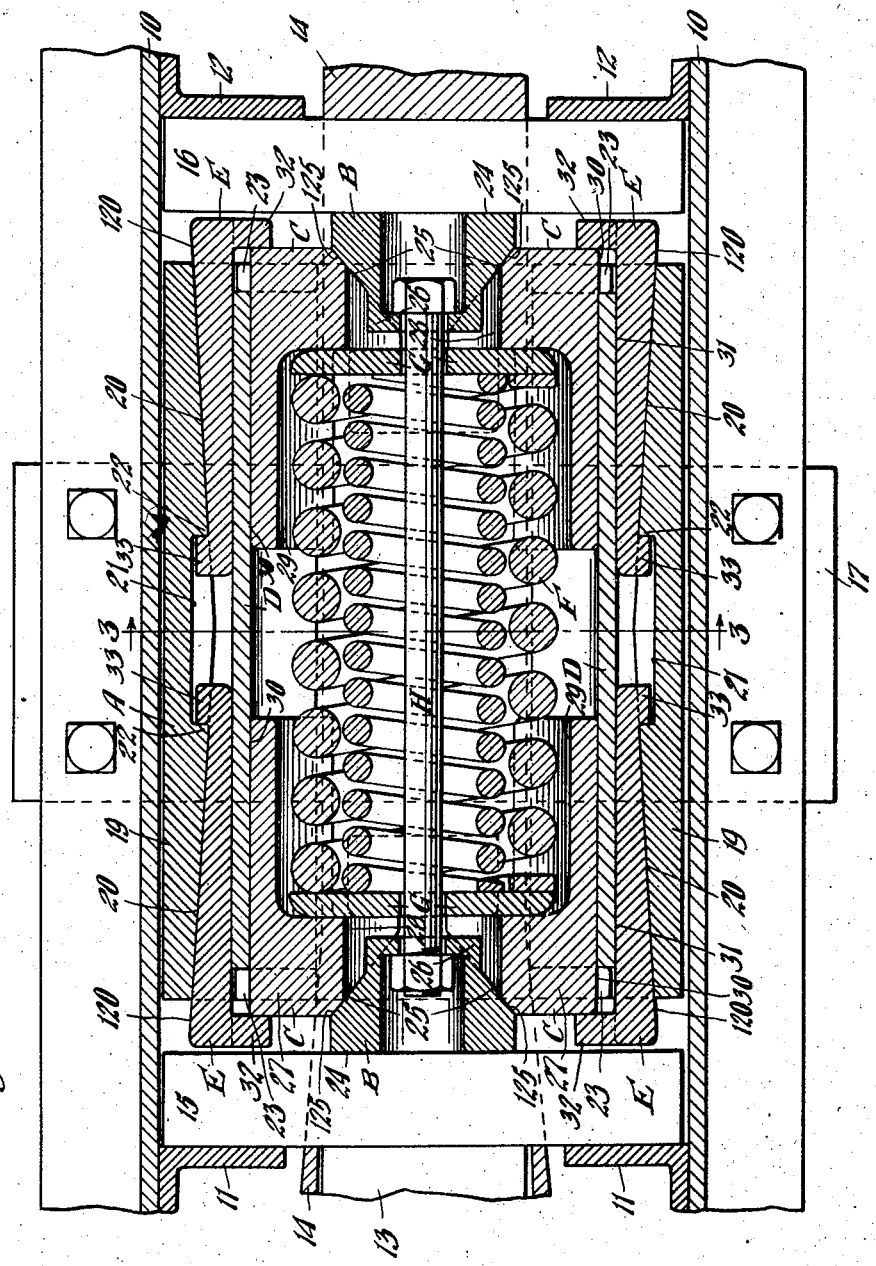

July 27, 1926.

S. B. HASELTINE 1,593,938

SHOCK ABSORBING MECHANISM

Filed August 4, 1924

2 Sheets-Sheet 1

Witnesses

Wm. Geiger

Inventor
Stacy B. Haseltine

By George D Haight
His Atty.

July 27, 1926.
S. B. HASELTINE
SHOCK ABSORBING MECHANISM
Filed August 4, 1924
1,593,938
2 Sheets—Sheet 2
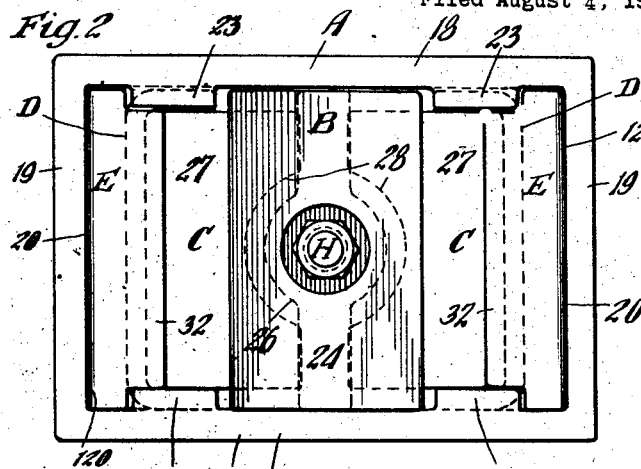
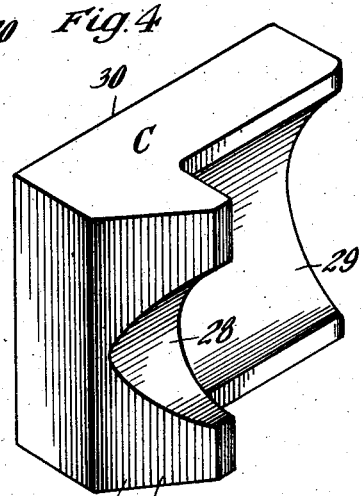
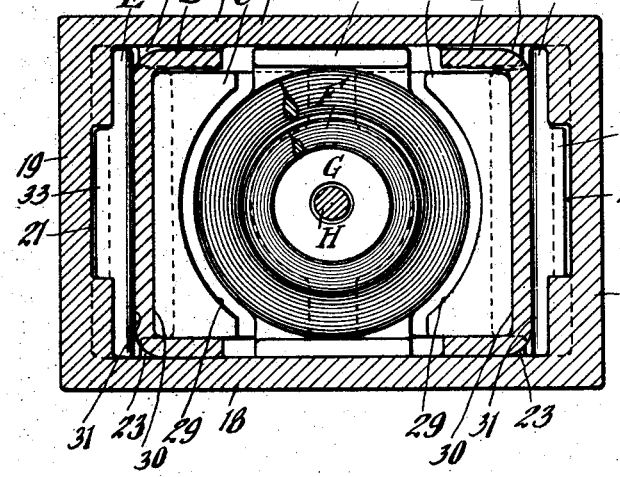
Witnesses
Wm. Geiger
Inventor
Stacy B. Haseltine
By George D. Haight
His Atty.

Patented July 27, 1926.

1,593,938

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

SHOCK-ABSORBING MECHANISM.

Application filed August 4, 1924. Serial No. 729,875.

This invention relates to improvements in shock absorbing mechanisms.

One object of the invention is to provide a high capacity friction shock absorbing mechanism especially adapted for railway draft riggings, of the friction plate type having preliminary relatively light action, and high capacity frictional resistance and differential action during the remainder of the compression stroke.

Another object of the invention is to provide a mechanism of the character indicated, wherein simple and efficient means is provided for restoring all of the parts of the mechanism to normal position, after each compression stroke.

Other objects and advantages of the invention will more fully and clearly appear from the description and claims hereinafter following.

In the drawings, forming a part of this specification, Figure 1 is a longitudinal, horizontal, sectional view of a portion of a railway draft rigging, showing my improvements in connection therewith. Figure 2 is a front end, elevational view of the shock absorbing mechanism proper. Figure 3 is a vertical, transverse, sectional view of the shock absorbing mechanism proper, corresponding substantially to the line 3—3 of Figure 1. And Figure 4 is a detailed, perspective view of one of the friction shoes used in connection with my improved mechanism.

In said drawings, 10—10 indicate channel-shaped, centre or draft sills of usual construction, of a railway car underframe, to the inner faces of which are secured front stop lugs 11 and rear stop lugs 12. The inner end of the drawbar is indicated at 13, the same being operatively connected to a yoke 14 of well known form. The shock absorbing mechanism proper and the front and rear followers 15 and 16 are disposed within the yoke 14. The yoke and the parts therewithin are supported in operative position by a detachable saddle plate 17.

The improved friction shock absorbing mechanism, as shown, comprises broadly a friction shell or casing A; front and rear wedge blocks B—B; front and rear pairs of friction wedge shoes C—C; two friction plates D—D; two front and two rear differential friction elements E—E; a spring resistance F; front and rear spring followers G—G and a retainer bolt H.

The friction shell A is in the form of a rectangular, box-like casting open at the front and rear ends and has spaced, longitudinally disposed top and bottom walls 18—18 and spaced, longitudinally disposed side walls 19—19. The opposed inner surfaces of the side walls 19 converge slightly from the opposite ends toward the center of the shell, presenting two sets of interior friction surfaces 20—20. Intermediate the ends of the shell, each side wall is recessed on the inner side as indicated at 21, providing front and rear abutment shoulders 22. The top and bottom walls 18 of the shell are provided on the inner side with short transverse ribs 23, for a purpose hereinafter described, each wall having a pair of ribs at the front and a pair of ribs at the rear end thereof, the ribs of each pair being spaced laterally, as shown, and having their outer ends spaced from the corresponding side walls 19.

The front and rear wedge blocks B are of like design, each block being in the form of a hollow casting and having a flat, transverse outer face 24 adapted to abut the inner surface of the corresponding main follower. Each block is also provided with a pair of faces 25 at the opposite sides thereof, converging inwardly of the mechanism and adapted to coact with the adjacent friction shoes. The inner end of each block is of cylindrical cap-like shape as indicated at 26, providing an interior seat serving as an anchorage for the corresponding end of the retainer bolt H.

The friction shoes C are four in number and are arranged in pairs at the front and rear ends of the mechanism, cooperating with the corresponding wedge blocks B. On the inner side, that is, the side nearest the longitudinal axis of the mechanism, each shoe C has a lateral enlargement 27 provided with an outer wedge face 125 correspondingly inclined to and adapted to cooperate with one of the faces 25 of the corresponding wedge block B. The enlargement 27 is recessed on the inner side as indicated at 28 to accommodate the adjacent side of the cylindrical portion 26 of the cooperating wedge block B, the recess being so proportioned as to provide sufficient clearance to permit a predetermined lateral movement of the shoes toward the axis of the mechanism. Inwardly of the enlargement and on the same side, each shoe is cut away as indicated at 29 to accommodate the corresponding side of the spring resistance F, sufficient clearance being provided to allow for the lateral movement of the shoe, hereinbefore referred to. At the opposite side, each shoe has a flat, longitudinally disposed friction surface 30 adapted to cooperate with one of the friction plates D.

The friction plates D are disposed on opposite sides of the longitudinal axis of the mechanism, each plate being interposed between the shoes D and the differential wedge elements E at the corresponding side of the mechanism. Each plate D is of channel form as most clearly shown in Figure 3, having the web portion thereof vertically disposed and the top and bottom flanges inwardly projecting therefrom and embracing the corresponding front and rear friction shoes. Each of the plates D is fixed with reference to the casing A, being held against longitudinal movement by having its front and rear ends bearing on the front and rear ribs 23 at the corresponding side of the casing. In this connection it will be noted that the plates are so mounted as to have free lateral movement within the casing. The flanges also stiffen the plate longitudinally to prevent distortion thereof during the compression stroke of the mechanism.

The differential friction elements E which are four in number, are arranged in pairs at opposite ends of the mechanism, being interposed between the corresponding ends of the mechanism, being interposed between the corresponding side wall of the casing and the adjacent friction plate. Each of the differential friction elements E has a flat inner face 31 cooperating with the outer surface of the corresponding plate D, and a flat outer surface 120, correspondingly inclined to and cooperating with one of the interior friction surfaces 20 of the corresponding side wall 19 of the casing. At its outer end each element has a flange 32 laterally projecting inwardly therefrom and overhanging the outer end of the adjacent friction wedge shoe C, as most clearly shown in Figure 1. The flanges 32 are cut away at their upper and lower edges as clearly shown in Figure 2, to clear the ribs 23 of the casing. At the opposite end, each friction element has a lateral outwardly projecting lug 33 working in the recess 21 of the corresponding side wall of the casing and cooperating with one of the shoulders 22 at the end of said recess. By engagement with the shoulders 22, the outward movement of the friction elements E is positively limited, and the flanges 32 on the elements E in turn limit the outward movement of the friction wedge shoes by engagement with the outer ends of the latter. When the parts are in normal position, the outer ends of the friction elements E are normally slightly spaced from the adjacent main followers to provide for preliminary action of the wedging system.

The spring resistance F, which comprises an inner light and an outer relatively heavier coil, is interposed between the front and rear spring followers G, the spring resistance being centered by inwardly projecting flanges at the top and bottom edges of the followers G, the lower flanges also serving as a supporting means for the spring resistance. The followers G in turn bear on the enlargements 27 of the corresponding wedge friction shoes C.

The parts are held in assembled relation and the mechanism maintained at proper overall length by the retainer bolt H, extending through the inner coil of the spring resistance F and aligned openings in the front and rear spring followers G and having its front and rear ends anchored in the recesses of the hollow front and rear wedge blocks respectively. The bolt H also serves to hold the mechanism under initial compression.

The operation of the mechanism is as follows, assuming an inward or buffing movement of the drawbar. Upon inward or rearward movement of the drawbar, the front follower 15 will be moved inwardly relatively to the rear follower 16 forcing the wedges B and the shoes C relatively toward each other, compressing the spring resistance F and placing the friction plates D and friction elements E under increased lateral pressure, due to the wedging action between the front and rear wedges and the corresponding pairs of friction wedge shoes. As the rearward movement of the follower 15 continues, the front set of shoes will slide on the friction surface of the plates D, and the plates D will slide on the friction surfaces of the rear pair of shoes. During this action, the shoes will be moved out of engagement with the flanges 32 of the corresponding friction elements E. This action will continue until the front and rear followers respectively engage the front and rear pairs of friction elements E, whereupon the friction elements E will be moved inwardly of the casing A, slipping on the friction surfaces of the plates D and the interior friction surfaces 20 at the front and rear ends of the casing. Due to the converging relation of the opposite faces 20, a differential action will be set up causing the shoes C of each pair to approach each other laterally of the mechanism, the shoes slipping on the wedge surfaces 25 of the front and rear wedge blocks. Due to the differential action just described, the front and rear pairs of friction wedge shoes will approach each other at a greater rate of speed than the elements E, thereby further compressing the main spring resistance. The described movement of the parts will continue until the actuating force is removed or until the opposite ends of the casing A are engaged by the front and rear followers respectively. The parts are so proportioned that the inner faces of the flanges 32 will abut the front and rear ends of the friction plates D simultaneously with the engagement of the casing by the front and rear followers. The friction casing, together with the friction elements E and the plates D will thus act as a solid column to transmit the actuating force directly to the rear follower and stop lugs, thereby preventing the spring resistance from being driven solid.

Upon reduction of the actuating force, the wedge pressure will be relieved, due to the comparative bluntness of the angle included between the faces 25 of the wedge blocks B, and there will be an initial release of the friction shoes and wedges independently of any relative movement of the friction elements E. This initial release action is due to the outer ends of said shoes C being spaced inwardly from the flanges 32 of the corresponding friction elements E, as hereinbefore described. An easy and quick release and certain reduction of the lateral pressure is thus assured. As the two pairs of shoes at the opposite ends of the mechanism are moved outwardly, due to the expansive action of the spring resistance, the outer ends of said shoes will be brought into engagement with the flanges 32 of the friction elements, carrying the latter outwardly and restoring the same to normal position. Outward movement of the friction elements will be limited by the lugs 33 thereof engaging the shoulders 22 of the casing, thereby also centering the casing, outward movement of the wedge blocks B being limited by means of the retainer bolt H.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior friction surfaces; a wedge friction system adapted to initially receive the actuating force; a main spring resistance; friction plates coacting with said friction wedge system; differential friction elements interposed between said plates and said interior shell friction surfaces; and means on said friction elements for limiting the outward movement of said shoes.

2. In a friction shock absorbing mechanism, the combination with a double ended friction shell, having inwardly converging friction surfaces at the opposite ends thereof; of differential friction elements cooperating with said shell friction surfaces; wedge pressure transmitting means at the front and rear ends of said mechanism; wedge friction shoes cooperating with said means; friction plate means interposed between said friction shoes and elements, said last named means being fixed against longitudinal movement with reference to the shell; and a main spring resistance cooperating with said shoes.

3. In a friction shock absorbing mechanism, the combination with a friction shell having front and rear opposed sets of inwardly converging, interior friction surfaces; of a differential friction element cooperating with each friction surface of the shell; a wedge friction system at each end of the mechanism adapted to receive the actuating force; a main spring resistance coacting with said wedge friction systems; and friction plates interposed between said wedge friction systems and said elements.

4. In a friction shock absorbing mechanism, the combination with follower acting means; of a friction shell having front and rear opposed sets of interior surfaces; differential friction elements cooperating with said shell friction surfaces, said elements being normally spaced from said follower acting means and adapted to receive the actuating pressure after a predetermined compression of the mechanism; a wedge pressure transmitting member cooperating with each follower and adapted to initially receive the actuating force; wedge friction shoes cooperating with each wedge member; a main spring resistance; and a friction plate interposed between the wedge friction shoes and the friction elements at the coresponding side of the mechanism.

5. In a friction shock absorbing mechanism, the combination with front and rear follower acting means; of a friction shell having front and rear opposed, inwardly converging friction surfaces; front and rear sets of elongated, differential friction elements cooperating with said shell friction surfaces and adapted to be engaged by corresponding follower means, said elements and shell having co-acting stop means thereon for limiting the outward movement of said elements and maintaining their outer ends normally out of contact with the corresponding follower; wedge pressure transmitting means engaged by each follower acting means; a pair of friction wedge shoes cooperating with each pressure transmitting means; a main spring resistance; and friction plates interposed between said shoes and elements.

6. In a friction shock absorbing mechanism, the combination with front and rear followers, relatively movable toward and from each other; of a friction shell interposed between said followers, said shell having front and rear opposed sets of friction surfaces on the interior thereof; longitudinally disposed, elongated differential friction elements cooperating with said shell friction surfaces and adapted to be engaged by said follower; wedge pressure transmitting means engaged by each follower acting means; a plurality of wedge friction shoes cooperating with each wedge pressure transmitting means; a main spring resistance; and friction plates interposed between said shoes and elements.

7. In a friction shock absorbing mechanism, the combination with front and rear follower members relatively movable toward and from each other; of a friction shell interposed between said followers and having its front and rear ends normally spaced from the respective followers, said shell having front and rear opposed, inwardly converging friction surfaces; differential friction elements cooperating with said shell friction surfaces and adapted to be engaged by said followers, said elements and shell having coacting stop means thereon for limiting the outward movement of said elements to maintain their outer ends normally out of contact with said followers; a wedge pressure transmitting member engaged by each follower; a plurality of friction wedge shoes cooperating with each wedge member, a main spring resistance; friction plates interposed between said shoes and elements; and means on said friction elements for limiting the outward movement of said shoes.

8. In a friction shock absorbing mechanism, the combination with front and rear followers relatively movable toward and from each other; of a friction shell interposed between said followers and having its front and rear ends normally spaced from the respective followers, said shell having front and rear opposed, inwardly converging friction surfaces; an elongated, longitudinally disposed differential friction element cooperating with each shell friction surface, said element being adapted for engagement and actuation by one of said followers; means for normally holding said elements out of contact with said followers; a longitudinally disposed friction plate at each side of the mechanism, said plates being held against longitudinal movement with reference to the shell and frictionally engaging the front and rear elements at the corresponding side of the mechanism; front and rear lateral pressure creating means cooperating with the respective followers, each of said means including a wedge pressure transmitting member and a pair of friction wedge shoes cooperating with said friction plates; and a main spring resistance.

9. In a friction shock absorbing mechanism, the combination with front and rear followers relatively movable toward and from each other; of a friction shell interposed between said followers and having its front and rear ends normally spaced from the respective followers, said shell having front and rear opposed, inwardly converging friction surfaces; an elongated, longitudinally disposed differential friction element cooperating with each shell friction surface, said element being adapted for engagement and actuation by one of said followers; a longitudinally disposed friction plate at each side of the mechanism, said plates being held against longitudinal movement with reference to the shell and frictionally engaging the front and rear elements at the corresponding side of the mechanism; front and rear lateral pressure creating means cooperating with the respective followers, each of said means including a wedge pressure transmitting member and a pair of friction wedge shoes cooperating with said friction plates; a main spring resistance; and means on said elements cooperating respectively with said shoes and shell for effecting restoration of said shell to normal position and limiting the outward movement of said shoes.

10. In a friction shock absorbing mechanism, the combination with front and rear followers relatively movable toward and from each other; of a friction shell adapted to be engaged by said followers when the mechanism is fully compressed to limit inward movement of the same, said shell having inwardly converging friction surfaces; differential friction elements cooperating with said shell friction surfaces, said elements adapted to be engaged by said followers after a predetermined relative movement of the latter; wedge pressure transmitting means; wedge friction shoes cooperating with said means; friction plate members cooperating with said friction shoes and elements, said elements having means thereon adapted to engage the opposite ends of said plate members to limit the inward movement of the elements at the same time that the movement of the followers is limited by engagement with the shell, whereby said elements, plate members, and shell together function as a column-load-sustaining means; and a main spring resistance cooperating with said shoes.

In witness that I claim the foregoing I have hereunto subscribed my name this 10th day of July 1924.

STACY B. HASELTINE.